Patented Apr. 5, 1949

2,466,261

UNITED STATES PATENT OFFICE 2,466,261

PROCESSED OAT FRACTION

Sidney Musher, New York, N. Y., assignor to Musher Foundation Incorporated, New York, N. Y., a corporation of New York No Drawing. Application July 29, 1944, Serial No. 547,300

7 Claims. (Cl. 99—150)

1

The present invention relates to a special method for the processing of an unusual oat fraction as well as to the production of a novel oat product which has very high water absorption properties as well as excellent stabilizing properties.

It is an object of the present invention therefore to provide a special oat fraction which has greatly increased water absorption characteristics while at the same time it retains its full gum-like and stabilizing properties.

A further object is to provide an oat product which will give to food and other compositions stabilization as well as high water absorption characteristics and other desirable physical characteristics, these objects being produced by economical and readily available means.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has now been found that when a certain fraction of oats has been properly separated from the oat grain then gelatinized with the final drying of the gelatinized product being carried out at relatively low temperatures and desirably under reduced pressures that the said gelatinized special oat fraction may be incorporated as an ingredient and stabilizer in a food product to give such food product excellent body, texture and viscosity so that the food product containing the special oat fraction of the present invention will stand up for a long period of time in the dealers' cabinets and in the manufacturing plant.

As set forth in copending application, Serial No. 510,831, filed November 17, 1943, which has matured into Patent No. 2,355,028, August 1, 1944, the particular fraction of oats is best prepared by first milling the oats to remove the cellulosic hulls leaving the oat groats. This is desirably accomplished by drying the oats with their hulls to reduce the moisture content in order more readily to remove the hulls from the oats. The oat groats thus obtained are then specially processed to remove the relatively high starch fraction and to concentrate the relatively high protein fraction thereof, obtaining a fraction which contains desirably in excess of about 20% protein and most desirably in excess of 22% protein.

2

The groats are pulverized desirably in an attrition mill to such an extent that at least 50% and desirably 80% to 90% will pass through a screen or mesh or bolting cloth having a fineness in excess of about 60 mesh and desirably having a fineness in excess of 70 mesh.

The oat groats are ground as indicated above and the ground groats are then separated as by aspirating or screening into two fractions, namely, a coarse fraction and a fine fraction, the coarse fraction comprising the minor fraction of less than 50% by weight and most desirably comprising 10% to 20% of the total weight of the ground oat groats and the fine fraction comprising over 50% and most desirably between 80% and 90% of the total weight of the ground oat groats.

In the preferred procedure, the oat groats, after removal of the hulls by milling processes, are pulverized or ground and then by aspirating, bolting or screening, the relatively high starch containing oat fraction is removed. The pulverized oat groats may, for example, be aspirated to separate the minor fraction of the relatively low starch and relatively high protein containing materials. This process may where desirable be continued by regrinding, rescreening or reaspiration until the relatively high starch material has been largely removed leaving the relatively high protein fraction behind desirably to be ground to at least 60 mesh for use in accordance with the procedures of the present invention.

The coarse fraction obtained will generally have a protein content in excess of 20% and more desirably in excess of 22%. At the same time the starch content of the coarse fraction will be reduced to much less than the starch content of the fine fraction. For example, the starch content of the coarse fraction will be about 5% to 10% or more less than the starch content of the fine fraction.

According to one method of separating the relatively high starch fraction which is necessary to obtain the gelatinous properties in most highly developed condition, the groats are ground so that a major proportion thereof, say at least 50% to 80%, will have a fineness in excess of about 60 mesh and desirably at least 60% to 70% of the ground material will have a sufficient fineness to go through about a 90 mesh screen.

Then the ground material is screened, preferably through a fine silk screen or aspirated to remove all particles which will not go through a 60 mesh screen.

A most highly desirable method is to grind the oat groats until over 75%, and desirably between 80% and 90% will go through a 70 mesh screen but wherein the balance of between 10% and 20% remains on the screen. Then the ground groats are aspirated or screened to remove all the coarse particles and to separate the fine fraction comprising 80% to 90% from the coarse fraction comprising the balance of 10% to 20% which coarse fraction is used in accordance with the procedures of the present invention.

The oat material which goes through the screen or the fine material which is aspirated will contain the relatively high starch fraction whereas the material left behind on the screen or the coarse fraction thereof will be relatively low in starch content.

The oat fraction thus obtained and desirably after the oat fraction has been finely divided to at least about 50 mesh is gelatinized. The gelatinization is accomplished, for example, by adding sufficient water to the oat fraction such as by using between 3 and 8 parts and preferably about 4 parts of water to each one part of the oat fraction with heating to a temperature of at least about 160° F. to 180° F. and desirably to a temperature of about 165° F. to 170° F.

The oat fraction may also be gelatinized by the injection of steam until the starch granules are gelatinized and with the temperature of the oat fraction due to the injection of the steam reaching a point of at least about 160° F. to 180° F.

The preferable procedure is for the oat fraction first to be finely divided so that it will go through at least about a 50 mesh screen before the gelatinization takes place although the coarse fraction may also be gelatinized. Where the coarse fraction is gelatinized a longer time period is involved in order to obtain thorough gelatinization of the starch granules. For example, the coarse fraction may have to be heated for as much as 15 to 45 minutes to obtain gelatinization whereas the finely divided fraction may require a heating of only several minutes to 10 or 15 minutes dependent upon the temperature which is used.

After gelatinization, the gelatinized special oat fraction is then desirably dried. It is important that the drying be conducted so that the dried particles will not be subjected to a temperature exceeding about 170° F. For this reason, the use of the atmospheric drum drier is highly undesirable where the high water absorption characteristics of the gelatinized fraction as well as the gum-like properties of the original oat fraction are to be retained.

Even though the finely divided special oat fraction may be heated in water to a temperature of, for example, 180° F. to provide the gelatinization effect, nevertheless where the gelatinized product is dried, the final dried product as it comes off the drum in dried form should not be exposed to heating in its dry condition to in excess of about 170° F. and preferably the highest temperature to be employed is 150° F.

The drying of the gelatinized special oat fraction therefore should be conducted by the use of a vacuum drum or tray drying or spray drying apparatus under which conditions the maximum temperature to which the dried gelatinized oat fraction will be exposed is 170° F. and preferably 150° F.

It has been found that this procedure of gelatinizing the special oat fraction at an elevated temperature sufficient to gelatinize the starch granules which may be as high as 180° F. or even higher followed by drying the gelatinized special oat fraction and where the drying is conducted so that the dried gelatinized particles will not be subject to a temperature in excess of 170° F. will produce a product that has unusually high water absorption characteristics with full retention of the gum-like characteristics of the original product.

It has not been possible to obtain any gelatinized cereal fraction or even any other gelatinized oat fraction that will in any way equal the combined water absorption and stabilizing properties of the product made in accordance with the present procedure.

After gelatinizing and after drying at the low temperature the gelatinized special oat fraction is desirably further finely divided to in excess of 50 mesh and desirably to in excess of 60 mesh.

This gelatinized special oat fraction may be used as a stabilizer and ingredient for food products and particularly for cream cheese, salad dressings, ices, icings, sausage, and similar compositions, the addition being made in an amount of under 15% and preferably less than 10%. For most purposes, not over about 2% of the special oat fraction is used.

For example, the gelatinized special oat fraction may be used in the manufacture of ice cream, sherbets and ices as well as for other frozen dessert compositions where it is added in an amount of between about 0.25% and 1%.

The gelatinized special oat fraction of the present invention may also be added to cream before freezing where the cream is subsequently to be used in the manufacture of ice cream or other similar frozen dessert or may be added to the fruit such as to strawberries, peaches, etc., in a minor amount of less than 2% and desirably between 0.1% and 0.75% at the time the fruits are frozen.

As little as 0.05% to 2% of the finely divided gelatinized special oat fraction of the present invention may be utilized to develop unusual physical stabilizing characteristics and where desired even higher amounts may be employed such as up to about 5% to 10% although it is preferable to use not over about 2% against the weight of the food product.

For example, in the manufacture of icings, the gelatinized special oat fraction produced in accordance with the present invention and which desirably has been finely divided may be added to the icing composition in an amount of less than about 2% in lieu of pectin, algin, gelatin or similar stabilizer.

In the manufacture of cream cheese and other cheese spreads, the finely divided gelatinized special oat fraction may be used in an amount of between 0.4% and 1.5% in replacement for locust bean gum to retard syneresis, to give stabilization and fine body and texture and smoothness to the cream cheese.

For example, among the "cheese spreads" for which the gelatinized special oat fraction of the present invention may be used there are included pasteurized cheeses or pasteurized blended cheeses which may be made by comminuting and mixing, with the aid of heat and water, one or more lots of cheese into a homogeneous plastic mass. There may also be used processed cheeses which will generally contain not more than about 40% of water and not less than about 50% of milk fat. Other cheeses for which the gelatinized special oat fraction of the present invention may be used include cream cheese, creamed cottage cheese, cottage cheese and similar cheese spreads and among the cream cheese spreads there are included cheese relishes such as pimento cheese spreads, olive cheese spreads, pineapple cheese spreads and Roquefort cream cheese spreads.

For these cheese spreads and particularly for cream cheese, creamed cottage cheese and processed cheeses between 0.4% and 1.5% and desirably between about 0.5% and 0.75% of the finely divided gelatinized special oat fraction is added to the cheese product in order to retard syneresis and to retard the moisture from leaking out from the cheese and to retain in the cheese firm body and texture and desirable physical characteristics.

In the manufacture of candies and confections the gelatinized special oat fraction which desirably has been finely divided may be used in chocolate coatings to give improved spreading and dipping qualities to the chocolate and to retard blooming. The finely divided gelatinized special oat fraction may also be used in fondants, gum drops, cream and marshmallow fillings, as well as for other candy and confectionery products to give unusual thickening and stabilization characteristics.

In marshmallow fillings the finely divided gelatinized special oat fraction may be employed in replacement for corn syrup to give a high quality marshmallow product on the basis of using, for example, from 0.3% to 1.5% of the finely divided gelatinized special oat fraction in lieu of 10% or more of the corn syrup normally employed.

Similarly in the manufacture of jams and jellies, fruit icings and similar compositions, the finely divided gelatinized special oat fraction of the present invention may be employed in place of the more expensive gums to give high stabilization characteristics.

The finely divided gelatinized special oat fraction may also be utilized for bakery purposes such as for pie fillings, custards, and puddings.

An unusual stabilizing effect is also obtained by the addition of the gelatinized special oat fraction to salad dressings such as to mayonnaise which normally contains in excess of 65% total oil content, to the usual type of salad dressing which will generally be composed of 40% or less of oil with or without eggs and with starches, to French dressings, tartar spreads, relish spreads, fruit salad dressings, etc.

The gelatinized special oat fraction is added to these products preferably in an amount of less than about 5% and desirably in an amount of between 0.5% and 2% by weight against the weight of the salad dressing. The preferred method is to add the gelatinized special oat fraction to the oil normally used in the production of the salad dressing, dispersing the gelatinized special oat fraction in the oil and then adding the oil containing the gelatinized special oat fraction to the salad dressing in the normal manner. This dispersed the gelatinized special oat fraction throughout the body of the salad dressing, obtaining maximum stabilizing benefits. Where desired, the gelatinized special oat fraction may also be admixed with the starch and the starch containing the gelatinized special oat fraction may then be gelatinized in the normal manner.

The preferred amount of the gelatinized special oat fraction to be used in the food composition is desirably not over 2% and preferably 1% or less, and the gelatinized special oat fraction should be finely divided so that it will have a fineness in excess of about 50 mesh and preferably in excess of 60 mesh.

In all cases the most preferred procedure in the method of adding the gelatinized special oat fraction to the food composition such as the cheese spread or to the salad dressing is for the gelatinized special oat fraction to be thoroughly distributed throughout the body of the food composition with mechanical agitation. This agitation involves mixing by means of paddles in order to make certain that all of the gelatinized special oat fraction is not only mixed throughout the body of the food composition but that the full physical stabilizing benefits of the gelatinized special oat fraction are obtained.

It has been found particularly desirable for the gelatinized special oat fraction of the present invention, which preferably has been finely divided, to be added to aqueous products containing at least 10% of a sugar such as of dextrose, sucrose, glucose, lactose, etc., and desirably 40% to 50% more of sugar followed by heating to an elevated temperature of at least 150° F. and desirably to a temperature of between 190° F. and 210° F. or more to develop unusual plastic and viscous properties.

For example, in the manufacture of icings, the finely ground gelatinized special oat fraction is desirably added to the icing mix containing the sugar in aqueous solution, the addition being made in a small percentage of less than about 2% followed by heating in order to develop high viscosity and plasticity. This unusual viscosity and plasticity are particularly desirable in many food products such as in icings, jams, fruit ripples for ice cream, bakery and confectionery products, etc.

The gelatinized special novel oat fraction of the present invention also has been found to be of great value in increasing the viscosity of aqueous compositions and solutions such as in water, milk, or the like, and which aqueous composition may contain starch, sugar, sulfonated oils, printing inks, soaps or other materials and which increases viscosity is obtained even within wide ranges of pH such as between pH 2 and pH 10.

The gelatinized special oat fraction herein described has many useful properties and may be used as a thickening or stabilizing agent or gum in food products, pharmaceutical products, as a sizing for paper and textiles or as a stabilizing agent in physical two phase systems.

For example, the gelatinized special oat fraction of the present invention may be used in the preparation of cosmetics as for hand lotions, face creams, for baths or for application where a high viscosity and adhesiveness are desired. For example, from 2% to 15% of the gelatinized special oat fraction may be dispersed in water preferably with agitation and used as a base for cosmetic or dermatological purposes.

There may also where desired be incorporated along with the gelatinized special oat fraction or the fat extracted gelatinized special oat fraction minor amounts of mono-glycerides or di-glycerides or minor amounts of polyhydric alcohols in which at least one of the hydroxyl groups is free and in which at least one of the hydroxyl groups is replaced by a fatty acid radical or minor amounts of polyhydric alcohol esters. For example, the gelatinized special oat fraction may be combined with a mono- or di-glyceride or with such polyhydric alcohol esters as glyceryl-mono-oleate, glyceryl-monostearate, glyceryldistearate, diethylene glycol (mono or di) stearate, diethylene glycol (mono) oleate or any similar ester of a polyhydric alcohol having at least one free hydroxyl group. These combinations are very efficacious where it is desired to incorporate large quantities of air but at the same time retain high viscosity, heavy body and the non-sticking and non-crystallizing characteristics obtained in accordance with the procedures of the present invention.

The above polyhydric alcohol esters may be mixed mechanically with the gelatinized special oat fraction but preferably a paste or aqueous dispersion is prepared in which the gelatinized special oat fraction is dispersed in water such as in from 5 to 15 parts of water for each 1 part of the finely divided gelatinized special oat fraction followed by adding thereto the polyhydric alcohol ester or similar composition, which combination is then placed through a colloid mill or homogenizer to thoroughly disperse the polyhydric alcohol ester therethrough followed preferably by drying as on a drum drier or by tray drying or by similar dehydration but where the drying is conducted at a temperature under 170° F. and preferably under 150° F. to produce a composite mass in which the polyhydric alcohol ester is thoroughly dispersed in and through the gelatinized special oat fraction.

Whereas normally these polyhydric alcohol esters "oil off" or come to the surface when added to any food composition and thereby present a major difficulty when trying to obtain a uniform dispersion of the esters through the food composition, where the polyhydric alcohol ester is first combined with the gelatinized special oat fraction of the present invention an unusual colloid appears to be formed whereby the polyhydric alcohol ester is uniformly dispersed throughout the food composition and remains dispersed therethrough without the oily composition coming to the surface and without "oiling off."

It has furthermore been found that a synergistic effect is obtained on combining the polyhydric alcohol esters with the gelatinized special oat fraction of the present invention whereby the relative efficiency of the polyhydric alcohol ester is materially increased when combined with the gelatinized special oat fraction of the present invention over that obtained where the polyhydric alcohol ester is combined with gelatin or similar stabilizer.

Still further and unusual results are obtained either by first extracting the fat of the special oat fraction before gelatinization or less preferably by extracting the fat of the special oat fraction after gelatinization. This may be accomplished by treatment of the special oat fraction or of the gelatinized special oat fraction with a fat solvent such as the volatile hydrocarbon oils such as hexane or petroleum ether, acetone, carbon tetrachloride, dichlor ethyl ether, or similar fat solvent or, less preferably, either an alcohol such as methyl alcohol, ethyl alcohol, propyl alcohol, iso propyl alcohol or combinations of any of the above.

It has been found particularly desirable to use the gelatinized special oat fraction of the present invention for addition to sausage and similar ground meat compositions where high moisture absorption as well as stabilizing characteristics are desired and whereby the gelatinized special oat fraction permits an increased moisture absorption as well as moisture retention during the smoking and cooking operations.

For example, where desired, the gelatinized special oat fraction may first be combined with a small amount of water and then added to the meat chopper but it is preferable for the finely divided gelatinized special oat fraction to be added in dry form and for the moisture to be added in the form of ice or where ice is not available, in the form of water at the lowest possible temperature such as at a temperature not more than about 40° F. to 50° F.

Spices and salt are generally included as part of the mixture and the entire combination of the meat, finely divided gelatinized special oat fraction, water, salt and spices is thoroughly comminuted so as to form a substantially homogeneous mass of the sausage ingredients with the finely divided gelatinized special oat fraction thoroughly distributed throughout the body of the sausage mass.

A wide variety of meat products may be used as the basis for the sausage. For example, beef products including flanks, loins, shanks, chucks, weasand meat, and various trimmings such as tongue trimmings, hearts and tripe, pork products including back bone trimmings, back fat trimmings, shoulder trimmings, belly trimmings, jowl trimmings, heart trimmings, cheek meat, head meat, etc., either fresh or sweet pickled may be used.

The meats used may be either fatty or lean and preferably lean meats are employed. The meat may be frozen, fresh, or desirably subjected to a curing operation such as by using a curing mixture consisting of about 7½ pounds of water and between 6 and 7 pounds of salt, sugar and spices to each 100 pounds of meat to be cured, holding the meat in the cure for a period varying from 12 hours in the case of ground meat to 15 or 20 days in the case of large pieces of meat and is best carried out at a temperature of around 35° F. to 40° F.

Among the spices that may be used are included pepper, allspice, garlic, coriander, nutmeg, mace or other spice ingredients and with or without salt-peter or sodium nitrate.

The finished mixture may then be incorporated in a casing using either the Visking type casing or natural casing such as bungs.

The subsequent steps of smoking and cooking described below are generally followed. However, the sausage may where desired be only smoked and the cooking may be omitted or where desired, the cooking may be conducted as the first step and the smoking as the second step as is done in some grades of sausage.

The sausage may then be smoked such as at a temperature of between 130° F. and 200° F. and desirably at a temperature of between about 140° F. and 160° F. for a period of time varying from 1 hour to 3 or more hours. As a result of the smoking operation, a certain amount of loss of weight of the sausage takes place but the loss of weight that occurs where the finely divided gelatinized special oat fraction of the present invention is used is very materially lessened.

Before the gelatinized special oat fraction has been dried at reduced pressure and at the relatively low temperature set forth in the present invention, the gelatinized special oat fraction may be used as the base for homogenizing oils therein such as for the homogenization of the glyceride oils and fats, mineral oil, the vitamin oils including fish liver oils, vitamin A and D concentrates, carotene, oil extracted from alfalfa and cereal grasses or other carotene containing oils.

After the homogenization or dispersion of these oils in the gelatinized special oat fraction and in connection with which there may be utilized about 0.05% and as much as 50% to 60% of the oil against the weight of the dry ingredients of the special oat fraction and desirably where there is utilized about 10% to 20% of the oil against the weight of the dry ingredients of the special oat fraction, the gelatinized special oat fraction containing the added oil thoroughly dispersed therethrough preferably by homogenization may be dried at the reduced temperature such as by vacuum drum drying or by spray drying and where the temperature does not exceed about 170° F. and preferably does not exceed 150° F.

By the term "total protein" as used in the claims of this application is meant the total amount of protein present in the special oat fraction of the present application.

By a "finely divided oat product" as used in the application and claims is meant an oat product which is capable of going through at least about a 50 mesh screen.

By the term "dry milled oat product" as used in the present application and claims is meant an oat product which has been subjected to either grinding, screening, bolting, aspirating or combinations thereof or even to oil solvent extraction but wherein the oat product has been processed in the substantial absence of water.

Another method that may be followed for the preparation of the special oat fraction of the present invention is to first clip the whole oats containing the hulls to remove both the hulls and the upper 10% and preferably the upper 5% as well as the lower 10% and preferably the lower 5% of the elongated fraction of the oat groats. These upper and lower fractions of the oat groats together with the oat hulls may then be aspirated to separate the hull fraction, and the upper and lower oat groat fractions which have been removed from the hulls may then be finely divided to at least about 50 mesh and desirably to about 60 mesh to produce the special oat fraction. After removal of the hulls desirably by aspiration the remaining substantially hull-free fraction may then be further aspirated or bolted to remove between about 25% and 50% of the finer fraction or the hull-free fraction may be aspirated or bolted or otherwise processed to separate the low protein fraction in order to leave behind the fraction which contains in excess of 20% and desirably in excess of 22% total protein. The high protein fraction or the coarse fraction thus obtained may then be finely divided for use in accordance with the procedures herein set forth.

By the term "low temperature dried, gelatinized oat product" as used in this application and claims is meant an oat product the starch granules of which have been gelatinized and then dried without exposing the dry particles of the gelatinized oat product to a temperature over about 170° F. and preferably not over 150° F.

The present application is a continuation in part of application, Serial No. 510,831, filed November 17, 1943, entitled Oat product now Patent No. 2,355,028, August 1, 1944 and application, Serial No. 534,163, filed May 4, 1944, entitled Food composition, now Patent No. 2,355,030, August 1, 1944.

Having described my invention, what I claim is:

1. A method of producing a novel oat product which comprises dehulling oats, pulverizing the groats into two fractions, which two fractions consist of a minor proportion of coarse particles as one fraction and a major proportion of fine particles as another fraction, separating the minor proportion of coarse particles, gelatinizing the said coarse oat fraction and then drying the gelatinized coarse fraction at a temperature under about 170° F.

2. A method of producing a novel oat product which comprises dehulling oats, pulverizing the groats into two fractions which two fractions consist of a minor proportion of coarse particles as one fraction, said coarse fraction constituting 10% to 20% of the pulverized oat groats, and a major proportion of fine particles as another fraction, said fine fraction constituting 80% to 90% of the pulverized oat groats, separating the fraction which consists of the coarse particles, finely dividing the said coarse particles, gelatinizing the finely divided coarse particles, and then drying the gelatinized coarse oat fraction at a temperature under about 170° F.

3. A method of producing a novel oat product which comprises dehulling oats, pulverizing the groats until a major proportion thereof will have a fineness in excess of about 60 mesh, aspirating the pulverized groats to separate the minor proportion of the coarse particles from the major proportion of the fine particles, finely dividing the said coarse particles, gelatinizing the finely divided coarse particles, and then drying the gelatinized coarse oat fraction at a temperature under about 170° F.

4. A method of producing a novel oat product which comprises dehulling oats, pulverizing the groats until 80% to 90% thereof will have a fineness in excess of about 60 mesh, aspirating the pulverized groats to separate the coarse particles from the 80% to 90% proportion of fine particles, gelatinizing the said coarse particles and then drying the gelatinized coarse particles at a temperature under about 170° F.

5. A method of producing a novel oat product which comprises dehulling oats, pulverizing the groats into two fractions, which two fractions consist of a minor proportion of coarse particles as one fraction and a major proportion of fine particles as another fraction, separating the minor proportion of coarse particles, finely dividing the said coarse particles, dispersing the finely divided coarse particles in water, heating to at least about 160° F., and then drying the gelatinized finely divided coarse fraction at a temperature under about 170° F.

6. A method of producing a novel oat product which comprises dehulling oats, pulverizing the groats into two fractions which two fractions consist of a minor proportion of coarse particles as one fraction, said coarse fraction constituting 10% to 20% of the pulverized oat groats, and a major proportion of fine particles as another fraction, said fine fraction constituting 80% to 90% of the pulverized oat groats, separating the fraction which consists of the coarse particles, finely dividing the said coarse particles, dispersing each part of the finely divided coarse particles into between 3 and 8 parts of water, heating to between about 160° F. and 180° F., and then drying the gelatinized coarse oat fraction at a temperature under about 170° F.

7. A method of producing a novel oat product which comprises dehulling oats, pulverizing the groats into two fractions which two fractions consist of a minor proportion of coarse particles as one fraction, said coarse fraction constituting 10% to 20% of the pulverized oat groats, and a major proportion of fine particles as another fraction, said fine fraction constituting 80% to 90% of the pulverized oat groats, separating the fraction which consists of the coarse particles, finely dividing the said coarse particles, extracting the fat of the finely divided coarse particles with a fat solvent, gelatinizing the substantially fat free finely divided coarse particles, and then drying the substantially fat free finely divided coarse particles at a temperature under about 170° F.

SIDNEY MUSHER.

REFERENCES CITED

The following references are of record in the file of this patent:

UNITED STATES PATENTS

| Number | Name | Date |
| --- | --- | --- |
| 2,012,506 | Griffith et al. | Aug. 27, 1935 |
| 2,097,252 | Musher | Oct. 26, 1937 |
| 2,176,023 | Musher | Oct. 10, 1939 |
| 2,355,028 | Musher | Aug. 1, 1944 |
| 2,355,030 | Musher | Aug. 1, 1944 |